April 30, 1957 R. C. STEELE ET AL 2,790,207
METHOD OF EXPANDING HONEYCOMB
Filed Nov. 10, 1952
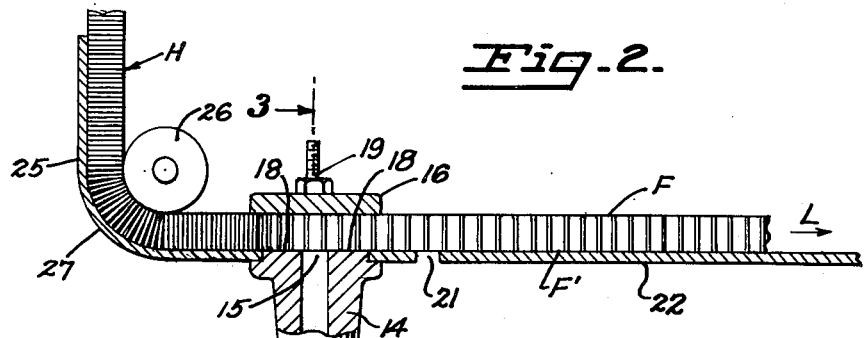
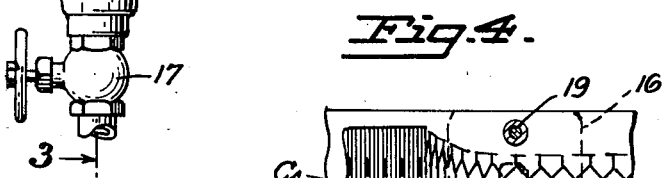
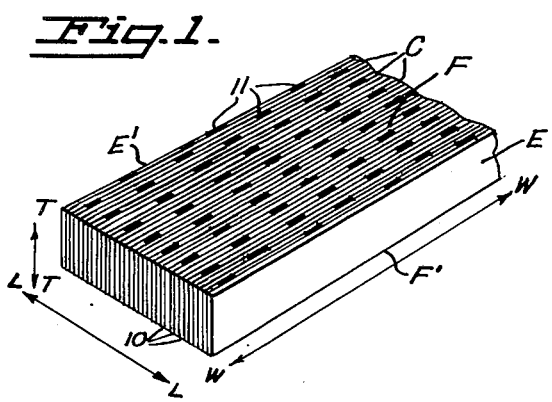
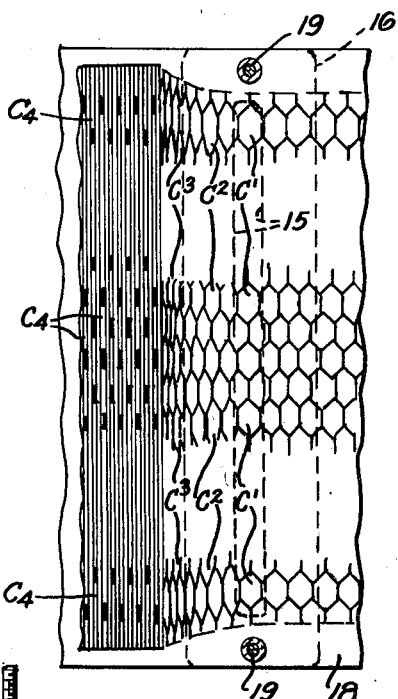
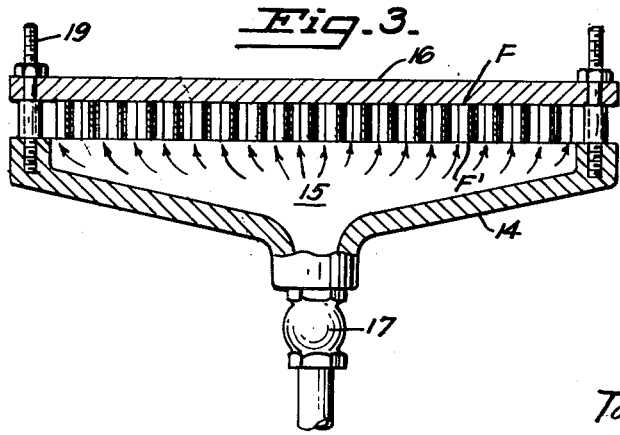
INVENTOR.
ROGER C. STEELE
EDWIN L. RULE
BY
*Townsend and Townsend*
ATTORNEYS

United States Patent Office 2,790,207
Patented Apr. 30, 1957

2,790,207

METHOD OF EXPANDING HONEYCOMB

Roger C. Steele, Berkeley, and Edwin L. Rule, Hayward, Calif., assignors to Hexcel Products Inc., a corporation of California Application November 10, 1952, Serial No. 319,682

4 Claims. (Cl. 18—56)

This invention relates to a new and improved method of expanding unexpanded expandable cellular material such as honeycomb.

It is a principal object of the present invention to teach a method of uniformly expanding unexpanded honeycomb by subjecting the interior of the unexpanded cell openings to fluid pressure.

It is a more specific object of the invention to provide a method of expanding progressively endwise an unexpanded section of honeycomb employing fluid pressure commencing at one end of the section and proceeding toward the other end thereof until all cell openings have been substantially uniformly expanded throughout the entire area of the honeycomb section.

Other objects and advantages of the present invention will become apparent upon reading the following specification and referring to the accompanying drawings in which similar characters of reference represent corresponding parts in each of the several views.

In the drawings:

Fig. 1 is a fragmentary perspective view of an unexpanded section of honeycomb.

Fig. 2 is a longitudinal sectional view of an embodiment of the honeycomb expanding means shown in relation to a section of honeycomb in the process of expansion.

Fig. 3 is a sectional view taken on line 3—3 of Fig. 2.

Fig. 4 is a fragmentary top plan view of the arrangement shown in Fig. 2 with certain parts shown in broken lines, and with certain portions of the honeycomb material illustrated schematically.

Referring now more particularly to the drawings, Fig. 1 is illustrative of an unexpanded section of honeycomb such as may be produced by the so-called "expansion process." One method and means for producing unexpanded section of honeycomb is disclosed in U. S. Letters Patent No. 2,610,934.

The unexpanded section of honeycomb is shown in Fig. 1 particularly as comprising a plurality of strips or webs 10 of the material from which the honeycomb is made—such as, for example, metal foil, resin impregnated cloth, glass cloth, paper or the like—and in which all of the said webs 10 extend in a common direction as do the alternately staggered bonding lines 11 which secure the adjacent strips or webs 10 to one another.

*Nomenclature*

In the drawings, the direction of "width" and/or "transverse axis" of the section is denoted by the reference line W—W, which, it is noted, extends in the direction of the webs 10 and bonding lines 11. The reference line L—L, which extends normal to the webs 10 and bonding lines 11, denotes the direction of "length" and/or the direction of "endwise expansion" of the section; the reference characters E and E′ denote opposite ends of the section; the reference character C denotes the cell openings of the section; the reference line T—T denotes the direction of "thickness" of the section and the direction in which the open-ended cell openings C extend; and the reference characters F and F′ denote opposite face surfaces or sides of the section, which are, in turn, defined by opposite ends of the open-ended cell openings C of the honeycomb section.

The method of expanding unexpanded honeycomb according to the invention involves, basically, subjecting the interior of the unexpanded cell openings of honeycomb to fluid pressure to thereby cause said cells to open up and expand. In the preferred practice of the invention, and particularly in the expanding of honeycomb sheets having a substantial overall expanded length, the method involves the steps of progressively expanding honeycomb in an endwise direction by providing a stream of fluid under pressure which preferably extends substantially the entire width of the honeycomb section to be expanded; and progressively moving the unexpanded honeycomb endwise over the fluid stream commencing at one end of the section and proceeding toward the other end thereof in such way as to progressively subject the interior of all of the unexpanded cell openings to fluid pressure and to thereby cause their expansion. One preferred practice of the method may be readily understood by having specific reference to Figs. 2, 3, and 4 of the drawings, which also disclose a preferred embodiment of the novel expanding means embodying the invention.

The particular embodiment of the expanding means shown in the drawings has particular utility in the expanding of honeycomb using water or air under pressure as the expanding fluid. Although it is understood that the invention herein disclosed, in its broader aspects, is not limited to the use of any particular expanding fluid, both water and air are considered to be extremely practical fluid mediums because of their availability and relative cheapness. Thus, for example, the invention has been parcticed successfully using water tapped directly from an ordinary municipal or city water supply system in which the water pressure in the lines averaged about 50–80 lbs./sq.in.

The expanding means disclosed in the drawings comprises an open-ended expansion chamber or zone through which a section of honeycomb may be forwarded. Said expansion chamber or zone is shown as comprising, more specifically, a base piece 14 having an orifice 15 and a cover piece or cap, indicated at 16.

The base piece 14 is disclosed as comprising a hollow block or housing formed with an elongate, relatively narrow orifice, heretofore indicated at 15, which, in turn, may be connected via conventional valve means 17 to a source of water or other suitable fluid under pressure (not shown). The upper face 18 of the housing preferably comprises a flat surface adapted to engage the underside of a section of honeycomb being expanded so as to direct fluid from the orifice into the honeycomb cells with a minimum of leakage or escape of the fluid between the base piece 14 and the honeycomb being passed thereover. The cover piece 16 comprises a flat cap or plate preferably mounted for adjustable vertical movement directly opposite the orifice 15. In the drawings said cap is shown as being mounted slidably adjacent its opposite ends on suitable vertical rods or bolts 19 to permit adjustable spacing between the cap and base piece and to permit accommodation of honeycomb sections of varying thicknesses.

Although the width, length, and shape of the orifice 15 may be varied to a considerable extent, we prefer to make the length of the orifice slightly less than the width of the honeycomb section in its expanded condition. It is characteristic of honeycomb to contract or narrow in the direction of its length—i. e., upon endwise expansion the individual bonded strips or webs of honeycomb, such as heretofore indicated at 10, will purse inwardly laterally causing an overall narrowing in width of the honeycomb section. Thus, the length of the orifice is determined with respect to the expanded, rather than the unexpanded, width of the section. Although the width of the orifice may also be varied considerably and yet be operative, the width of the orifice is shown in the drawings as being about the same as the nominal cell size of the honeycomb being expanded.

In operation the valve 17 may be opened so as to connect orifice 15 with its source of fluid under pressure, as for example, water or air under pressure. The fluid supply line may, if desired, be provided with suitable conventional pressure regulating means (not shown) for maintaining relatively constant fluid pressure flow to the expansion chamber. Opening of the valve 17 establishes a continuous stream of fluid under pressure through orifice 15, and in which the length of the stream extends substantially the entire expanded width of the honeycomb section to be expanded. The given section of honecomb may be progressively moved in an endwise direction slidably between orifice 15 and cover piece of cap 16. As the material is moved over and past the orifice, the fluid will enter and flow into the unexpanded, or partially expanded, open-ended cells from the underside F' of the honeycomb section. At the same time the cap 16 will function to close the open-ended cells from the opposite side F of the honeycomb section and thereby cause fluid pressure to rapidly build up within the interior of all cells which are moved within the path of the fluid stream. Each cell as it is subjected to the fluid pressure will be caused to expand and enlarge to its hexagonal shape.

It is pointed out that in actual practice the cap (which is in slidable contact with the upper face F of the honeycomb section) need not function to close the cells into which fluid is being introduced so tightly as to prevent any escape or leakage of the fluid between the cap and the upper face of the section. Generally speaking, the tighter the fit between the cap and honeycomb section, the more rapidly will fluid pressure build up within the cells. On the other hand, it is preferable not to maintain the cap so tightly pressed down against the honeycomb as to make progressive movement of the honeycomb section through the expansion chamber difficult.

Fig. 2 shows a section of unexpanded honeycomb H being forwarded from a hopper, comprising a guide plate 25 and guide roller 26, into and through the open-ended expansion chamber. By advancing the honeycomb section around a sharp bend or turn, as indicated at 27, in engagement with a roller, such as above indicated at 26, the material may be more easily advanced through the expansion chamber in a relatively straightline path of movement.

Fig. 4 discloses a honeycomb section in the process of expansion. It is pointed out that when the forward end of an unexpanded section of honeycomb is initially subjected to the action of the fluid pressure, the forwardly located end cells will upon expansion result in the inward pursing of the bonded webs of honeycomb material defining said cells. This inward pursing of the webs, as above mentioned, will result in a narrowing in the width of the honeycomb section. Moreover, the inward pursing of the webs adjacent the forward end of the block advanced into contact with the fluid stream will exert end stresses in the material tending to cause at least partial expansion of cells located within an adjacent rearward, relatively narrow, transversely delineated area of the section. In this connection Fig. 4 shows the forwardly located cells $C_1$ of the honeycomb material as being fully expanded when they reach a point directly over the orifice 15 and whereat they are subjected to the force of fluid pressure. Fig. 4 also shows the cells $C_2$ next in line as having already been caused to expand to a considerable extent simply by virtue of the stresses set up through previous expansion of cells $C_1$. Cells $C_3$ located within the transversely delineated area behind cells $C_2$, are shown as being expanded to a lesser extent; whereas cells $C_4$ are shown in their still unexpanded condition.

The fluid introduced into the cell openings as they pass over orifice 15 will escape or drain out of the openings upon being moved out of slidable engagement between the base plate and cover piece 16. In this regard, if a liquid expanding medium (such as water) is employed, drain openings 21 may be formed in conveying table or surface 22, located immediately forwardly of the expansion chamber, to allow for drainage of liquid from the cell openings after expansion.

In the expansion of most types of thermo-plastic or thermo-setting type resin impregnated honeycomb having thermoplastic qualities (such as resin impregnated paper, cloth, or glass cloth honeycomb), it is usually desirable to use a heated expanding fluid to cause softening of the impregnate during expansion of the cells. Thus, for example, in the case of honeycomb impregnated with a phenolic or modified phenolic three-stage synthetic resin, and in which the resin has been advanced to its second or "B" stage at the time the honeycomb is ready for expansion, relatively hot water at temperatures ranging from 160°-180° F. may be employed so as to soften the impregnate and render it more plastic during expansion of the cells. It is possible, of course, to also pre-heat resin impregnated honeycomb of the type above mentioned to cause it to soften prior to subjecting it to the fluid pressure expanding force—as, for example, by running the unexpanded section through an oven (not shown), or by dousing the honeycomb section to be expanded with hot water, steam, or hot air just prior to forwarding it through the expansion chamber and into contact with the fluid stream.

It is further pointed out that in the expansion of resin impregnated honeycomb according to the above described practice of heat softening the impregnate and expanding the cells under fluid pressure, the expanded shape of the honeycomb cells may in a sense be "frozen" or fixed in the material by cooling the impregnate below its thermo-softening point immediately after the honeycomb leaves the expansion chamber. This rapid cooling of the impregnate may be accomplished simply by continuously dousing the expanded honeycomb with cold water as it is fed or emerges from the expansion chamber.

Although the present invention has been described in considerable detail by way of illustration and example for purposes of clarity of understanding, it is understood that certain changes and modifications may be made within the spirit of the invention as limited only by the scope of the claims appended hereto.

We claim:

1. A method of expanding an unexpanded section of honeycomb wherein the unexpanded open-ended cells of the honeycomb define opposite sides of the section which includes the steps of: introducing into a plurality of unexpanded open-ended cells from one side of said section of honeycomb fluid under pressure, and simultaneously capping said open-ended cells from the side of said section of honeycomb opposite the side which said fluid under pressure is introduced into said cells to cause building up of sufficient pressure within said cells to cause expansion thereof.

2. The method of progressively expanding in an endwise direction a section of unexpanded honeycomb comprising the steps of: progressively subjecting area by area the interior of unexpanded cell openings located in contiguous transversely delineated areas of the unexpanded section to fluid under pressure commencing at one end of the section and proceeding toward the opposite end of the section until the interior of all unexpanded cells of the section have been subjected to fluid under pressure.

3. The method of progressively expanding a section of unexpanded honeycomb in an endwise direction comprising the steps of: providing a substantially continuous stream of fluid under pressure extending substantially the entire width of the honeycomb section to be expanded, progressively moving said unexpanded section endwise over said stream commencing at one end of said section and proceeding toward the other end thereof in such way as to subject the interior of each of the unexpanded cell openings to fluid pressure from said fluid stream.

4. A method of progressively expanding a section of unexpanded honeycomb in an endwise direction and wherein the unexpanded open-ended cells of the honeycomb define opposite sides of the section to be expanded comprising the steps of: providing a substantially continuous stream of fluid under pressure extending substantially the entire width of the honeycomb section to be expanded, progressively moving said unexpanded section endwise over said stream commencing at one end of said section and proceeding toward the other end thereof to cause said fluid stream to enter the interior of said unexpanded open-ended cells from a first side of said section, and simultaneously capping said open-ended cells from the side of said section of honeycomb opposite the side which said fluid stream is introduced into said cells.

References Cited in the file of this patent

UNITED STATES PATENTS

| | | |
|---|---|---|
| 1,209,308 | Lanhoffer | Dec. 19, 1916 |
| 1,310,437 | Roberts | July 22, 1919 |
| 1,728,471 | Bratring | Sept. 17, 1929 |
| 2,323,862 | Zimmerman | July 6, 1943 |
| 2,484,641 | O'Hara | Oct. 11, 1949 |
| 2,670,314 | Ungar | Feb. 23, 1954 |

OTHER REFERENCES

Ser. No. 395,688, Grundel (A. P. C.), published April 27, 1943.